(12) United States Patent
Miura

(10) Patent No.: US 8,137,799 B2
(45) Date of Patent: Mar. 20, 2012

(54) ARTICLE UNDERGOING STIMULUS-RESPONSIVE DEFORMATION AND VEHICLE PART USING THE SAME

(75) Inventor: Hiroaki Miura, Kamakura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 511 days.

(21) Appl. No.: 11/913,137

(22) PCT Filed: Mar. 15, 2006

(86) PCT No.: PCT/JP2006/305126
§ 371 (c)(1),
(2), (4) Date: Oct. 30, 2007

(87) PCT Pub. No.: WO2006/134697
PCT Pub. Date: Dec. 21, 2006

(65) Prior Publication Data
US 2009/0202811 A1    Aug. 13, 2009

(30) Foreign Application Priority Data
Jun. 16, 2005   (JP) .................. 2005-176763

(51) Int. Cl.
*B32B 3/26* (2006.01)
*G02F 1/1335* (2006.01)

(52) U.S. Cl. ............. 428/304.4; 428/1.1; 428/305.5; 428/308.4; 349/16; 252/299.01

(58) Field of Classification Search ............. 428/304.4, 428/1.1, 319.1, 305.5, 308.4; 349/16; 252/299.01
See application file for complete search history.

(56) References Cited

U.S. PATENT DOCUMENTS

| | | | |
|---|---|---|---|
| 4,510,069 A * | 4/1985 | Eidenschink et al. ... | 252/299.61 |
| 4,745,135 A * | 5/1988 | Thomas et al. ............... | 521/114 |
| 5,235,445 A * | 8/1993 | Hirai et al. ...................... | 349/89 |
| 5,331,448 A * | 7/1994 | Kajiyama et al. .............. | 349/16 |
| 5,451,454 A | 9/1995 | Fukahori et al. | |
| 5,888,666 A * | 3/1999 | Kawakami ...................... | 429/62 |
| 2002/0033929 A1* | 3/2002 | Sudo et al. ..................... | 349/182 |
| 2004/0056381 A1 | 3/2004 | Teramoto et al. | |
| 2005/0079663 A1* | 4/2005 | Masutani et al. ............. | 438/200 |
| 2006/0050189 A1 | 3/2006 | Ito et al. | |

FOREIGN PATENT DOCUMENTS

| | | |
|---|---|---|
| EP | 0260388 A2 | 3/1988 |
| EP | 0948074 A2 | 10/1999 |
| EP | 1 550 689 A1 | 7/2005 |
| JP | 2-175737 A | 7/1990 |
| JP | 5-194763 A | 8/1993 |
| JP | 7-209631 A | 8/1995 |
| JP | 9-211433 A | 8/1997 |
| JP | 2000-12851 A | 1/2000 |
| JP | 2000-117817 A | 4/2000 |
| JP | 2000-230069 A | 8/2000 |
| JP | 2000-318078 A | 11/2000 |
| JP | 2002-69813 A | 3/2002 |

(Continued)

*Primary Examiner* — Hai Vo
(74) *Attorney, Agent, or Firm* — Foley & Lardner LLP

(57) ABSTRACT

An article undergoing stimulus-induced deformation, that is capable of being driven rapidly and in large displacement in air, is provided.
An article undergoing stimulus-induced deformation comprising, incorporated in a polymer material having a cell, a liquid crystal serving as a deformation source in a skeleton other than the cell.

15 Claims, 12 Drawing Sheets

FOREIGN PATENT DOCUMENTS

| | | |
|---|---|---|
| JP | 2002-330006 A | 11/2002 |
| JP | 2003-12851 A | 1/2003 |
| JP | 2003-96229 A | 4/2003 |
| JP | 2004-109786 A | 4/2004 |
| JP | 2005-290170 A | 10/2005 |
| WO | WO 2004/054082 A1 | 6/2004 |

* cited by examiner (a)

(b)

(a)

(b)

ARTICLE UNDERGOING STIMULUS-RESPONSIVE DEFORMATION AND VEHICLE PART USING THE SAME

TECHNICAL FIELD

The present invention relates to an article undergoing stimulus-induced deformation, which contains a component deformable by converting electricity or other input energy to mechanical energy, for example, like a motor, a hydraulic or pneumatic type actuator or the like, and as a result of this deformation, is capable of quickly providing apparent volume change without accompanying flow-out of a solvent like liquid from a cushion body, and a vehicle part using such an article undergoing stimulus-induced deformation.

BACKGROUND ART

Conventionally, as a mechanical type drive source generally used, there has been a motor, a hydraulic or pneumatic type actuator or the like, but many of them are generally composed of metal and require large mass and space, and in addition, a lot of energy as a necessary drive source.

In addition, EP-A-1550689 discloses an actuator using an organic material which is obtainable in lightweight and in a space-saving way. A conductive polymer used here aims at utilization of electrochemical redox reaction, and application of expansion and contraction of the organic material to the above problems. However, a specific shape example obtained is limited to a film-like shape, and an expansion and contraction direction is also limited to one example of a longitudinal direction, and it is a type without accompanying volume change.

Furthermore, WO2004054082 describes a combination of a gel and a solvent as an example of one showing volume change. However, since it derives deformation of a skeleton material by squeezing out the solvent from the skeleton formed by gel with the use of electric stimulus, deformation speed is very moderate. Since it aims at driving a gel actuator, which was originally driving in a solvent, in air, it requires to have a solvent tank as a system, and thus has high risk of generating leakage of an electrolyte solution, or performance deterioration caused by electrolysis.

DISCLOSURE OF INVENTION

In view of the above problems, it is an object of the present invention to obtain an article undergoing stimulus-induced deformation that is capable of being driven rapidly and in large displacement, in air, by devising to obtain these materials as a cushion shape.

The present invention was made by noticing the above problems in a conventional organic actuator, aiming at furnishing a function deformable by converting input energy to mechanical output, to interior parts of an automobile or the like, as a new function, as well as enabling to obtain lightweight and space-saving.

The present invention relates to an article undergoing stimulus-induced deformation comprising, incorporated in a polymer material having a cell, a liquid crystal as a driving source in a skeleton other than the cell.

In addition, the present invention relates to an article undergoing stimulus-induced deformation comprising, incorporated in a polymer material having a cell, a component showing liquid crystallinity serving as a driving source as a main chain and/or a side chain, in a polymer chain of a material forming a skeleton other than the cell.

DESCRIPTION OF REFERENCE NUMERALS

1 a porous material, 2 a skeleton composed of a polymer material, 3 a cell, 10 a liquid crystal molecule, 11 an electrode, 12 a polymer chain, 13 a liquid crystal at a side chain, 14 a liquid crystal in a main chain, 20 a mold for foam-molding, 21 an electrode for electric field application, 22 a voltage generation apparatus, 30 a seat for one passenger, 31 a seating surface, 32 a bench seat, 33 a passenger, 40 a thermostatic chamber, 41 a laser displacement gauge, 42 a measurement head, 43 a measurement laser, 44 a displacement measurement direction of sample.

BEST MODE FOR CARRYING OUT THE INVENTION (An Article Undergoing Stimulus-Induced Deformation)

The article undergoing stimulus-induced deformation relevant to the present invention is characterized by composing of a polymer and having a liquid crystal serving as a deformation source in a skeleton other than the cell of the porous material, in a porous material having the cell.

Figure 1:
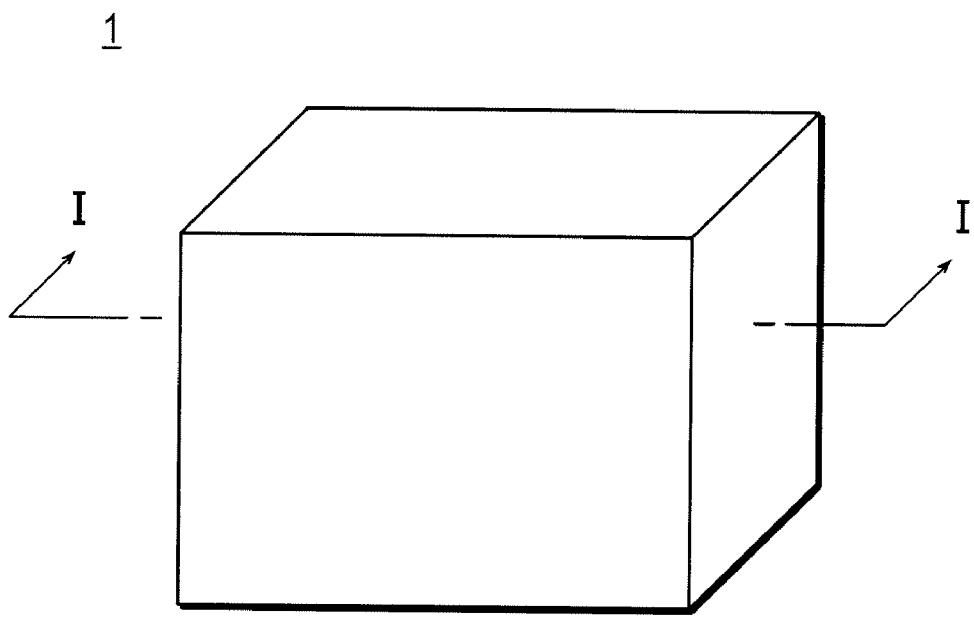
FIG. 1 is a perspective view and a cross-sectional view showing a shape example of a conventional porous material.
Figure 1:
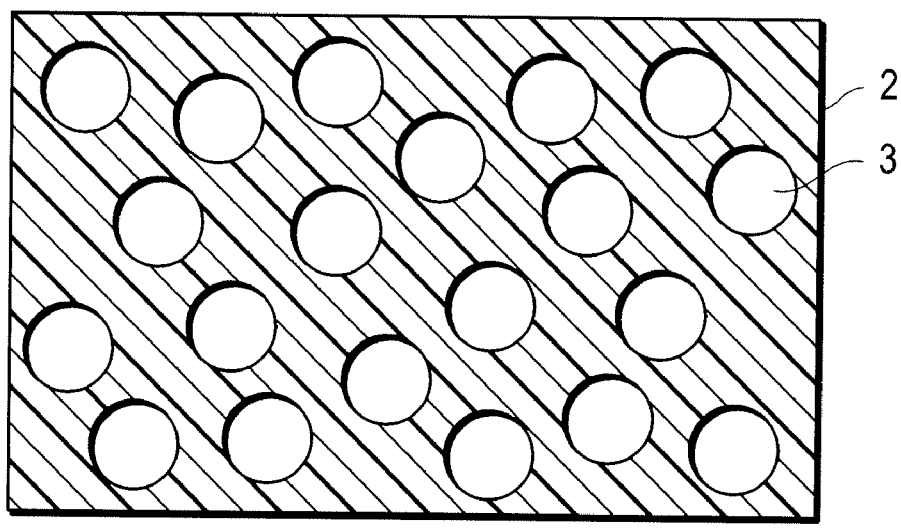
Figure 2:
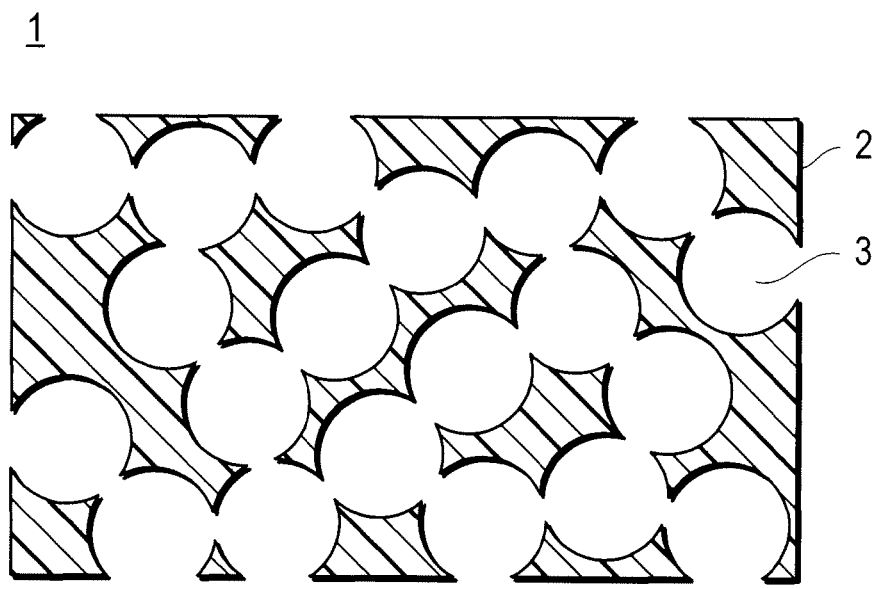
FIG. 2 is a cross-sectional view showing a shape example of a conventional porous material.
Figure 3:
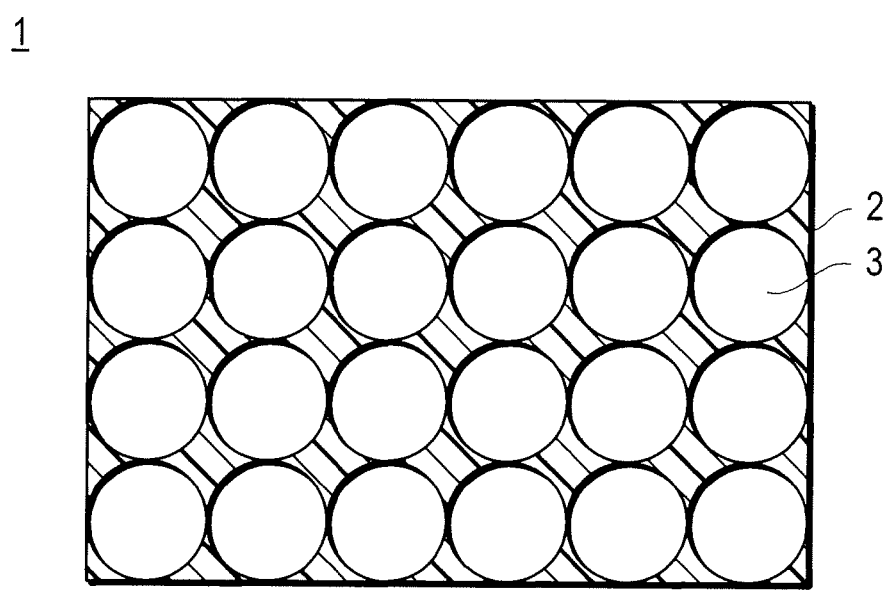
FIG. 3 is a cross-sectional view showing a shape example of a conventional porous material.
Figure 4:
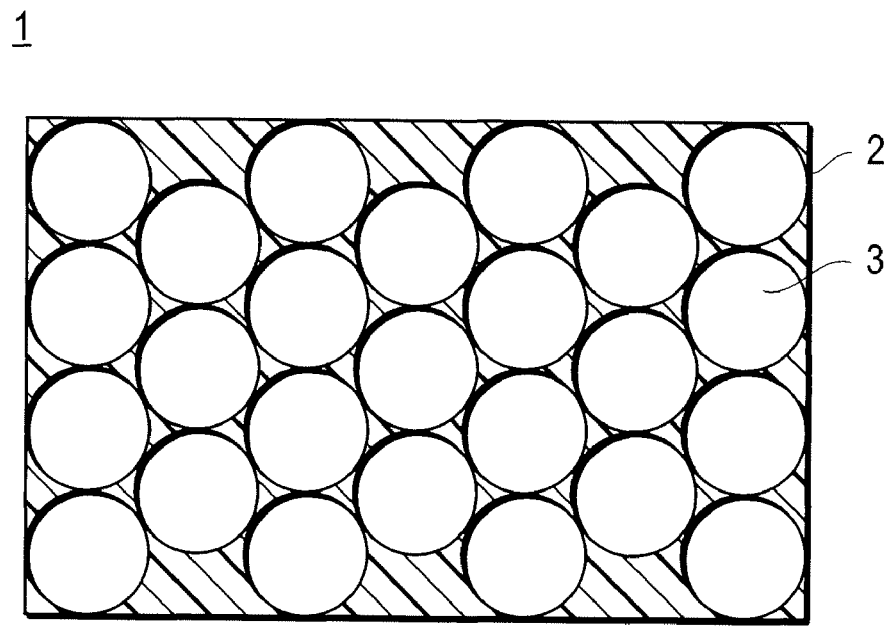
FIG. 4 is a cross-sectional view showing a shape example of a conventional porous material.
Figure 5:
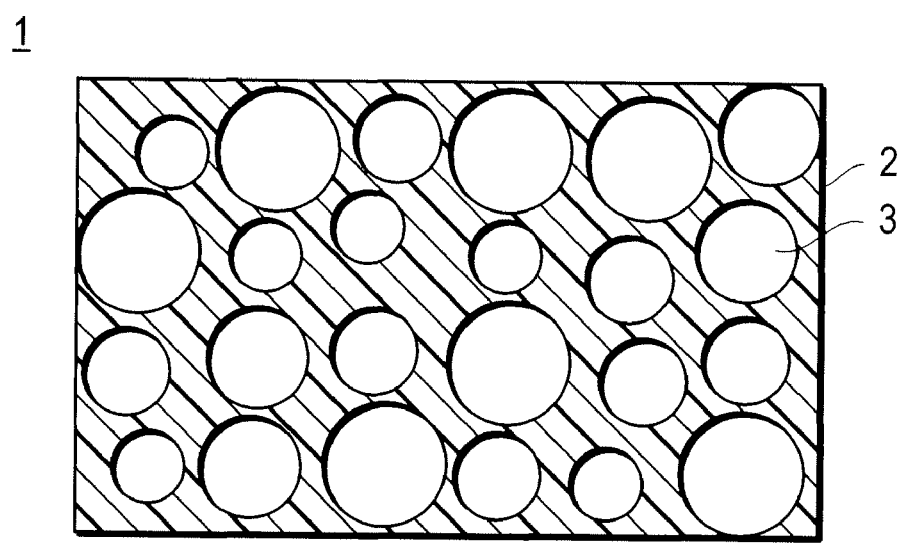
FIG. 5 is a cross-sectional view showing a shape example of a conventional porous material.
Figure 6:
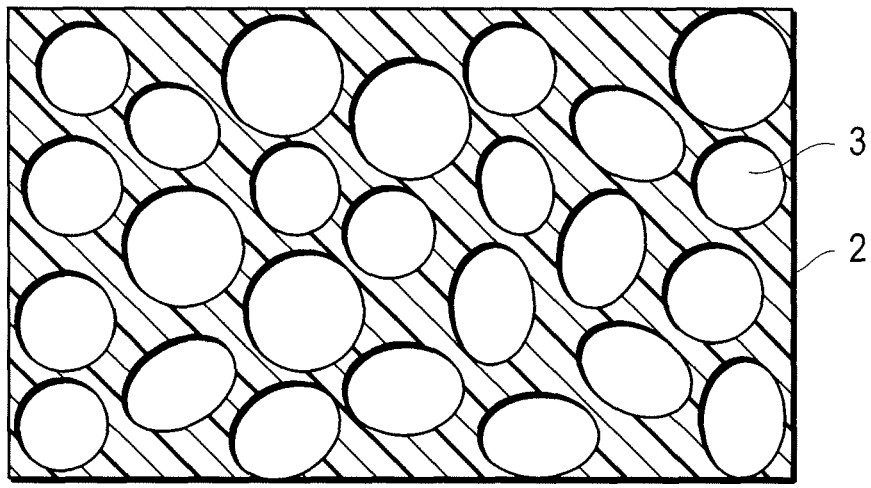
FIG. 6 is a cross-sectional view showing a shape example of a conventional porous material.

A general porous cushion material includes, as shown in drawings, one formed by a close cell (FIG. 1a: a perspective view, FIG. 1b: a cross-sectional view cut along an I-I line of FIG. 1a), one formed by an interconnected cell (FIG. 2); one periodically arranged with a cell (FIGS. 3 and 4); one formed by a cell having non-uniform size (FIG. 5); one having deformed cross-sectional shape of non-spherical cell cross-section (FIG. 6); or the like. They are used as means for tuning hardness or a spring constant of a cushion. It should be noted that, in the drawings in the present invention, a cell is represented by a circle or an ellipse, but it is only a representative example and the present invention should not be limited thereto.

As a polymer material composing this porous cushion material, polyurethane, polyvinyl alcohol, polyvinyl chloride, chlorinated polyethylene, polyethylene, polypropylene, ethylene-vinyl acetate copolymer, polyethyl methacrylate, polystyrene, styrene-butadiene-acrylonitrile copolymer, polyvinyl formal, epoxy, phenol, urea and silicone or the like is exemplified. These materials may be used alone or two or more kinds in combination.

What the present invention intends to is that the above function was attained by combination of device in a structure on a porous cushion, and device in a material, aiming at not only change of static characteristics of such a cushion, but also dynamic characteristics such as actuation or the like.

The porous material used in the present invention is defined as one having smaller use amount of a material as compared with apparent volume obtained by the external dimension, and one having smaller apparent density as compared with one having the same dimension composed of the solid material, owing to the cell obtainable by changing to a porous form. In general, a foamed material such as foamed polystyrene, foamed polypropylene and foamed urethane or the like is included. These materials have smaller density than that obtainable by the exterior dimension, irrespective of the cell being close or open. In the present invention, other than these, one composed of polymer gel or elastomer or the like is also suitable.

The void in these porous materials is defined as a portion containing air for one with an open cell; and a portion containing a foamed gas component or air substituted therefore for one with a close cell. The skeleton is defined as one composed of a polymer other than the cell.

A size of these cells is not especially limited, and cells prepared in a range of from about several hundreds nm to about several mm are suitable in view of being capable of obtaining easy skeleton deformation. Size of a cell is defined, in any of an open or close cell, as size of every one unit of foam. A smaller size or amount of a cell tends to provide a relatively thicker and larger skeleton, and smaller deformation amount in general. Larger size or amount of a cell tends to make maintaining the shape as a cushion body difficult, because of a smaller skeleton. As for expansion ratio, one from several times to about 50 times can be easily obtained, showing tendency to satisfy both a cushion body and deformation amount, but nothing is limited here.

Then, in the article undergoing stimulus-induced deformation of the present invention, it is more preferable that a cell in the porous material is an open one; this is because a close cell receive compression by deformation of the inclusion (an evaporated foaming agent or air) in the cell; namely it requires additional force for compression and tends to provide smaller deformation amount. An open cell, even when a cell part becomes small, are capable of flowing out air contained therein, and in addition, also when that part becomes large, are capable of providing rapid inhalation; this in turn makes deformation amount large, and extremely increases deformation speed.

It is preferable that the porous material used in the present invention is composed of polymer gel.

As an example of the polymer gel, a polyacrylic acid type, a polymethacrylic acid type, a polyacrylamide type, a polyvinyl alcohol type, a polyacrylonitrile type, a polymethyl methacrylate type, a polyurethane type, a polysulfone type, a polyester type, a polyamide type, a polysiloxane type or the like is included. More specifically, polyacylic acid gel, polymethacrylic acid gel, polyacrylamide gel, poly(acrylamide-acrylic acid) copolymer gel, poly(acrylamide-methacrylic acid) copolymer gel, quaternary gel of poly(acrylamide-trimethyl(N-acryloyl-3-aminopropyl)ammonium iodide) copolymer gel, polyacrylamide-2-methylpropanesulfonic acid gel, composite gel of polyvinylalcohol-polyacrylic acid, poly(2-acrylamide-2-methylpropanesulfonic acid-methacrylate-2-hydroxyethyl) copolymer gel, poly(2-acrylamide-2-methylpropanesulfonic acid-acrylonitrile) copolymer gel, alginate gel and collagen gel, or the like is included. These gel materials may be used alone, or two or more kinds in combination. In addition to these, one composed of a natural product also includes gel such as cornea based on a natural macromolecule such as protein, polysaccharide or the like; crystalline lens, albumen, tofu, konjak and gelatin or the like.

A(n) (liquid crystal) elastomer suitable to the present invention includes one wherein a mesogenic group, which is a center skeleton of a liquid crystal molecule, fundamentally is bound to a polymer chain as a side chain (in the present specification, a terminal part of a main chain is defined as a side chain), and generates a liquid crystal phase state of elastomer. It is more preferable that polysiloxanes are used as suitable elastomer in view of obtaining large deformation. Other examples include polymethacrylate, polychloroacrylate, or a polystyrene derivative present as a glassy state at room temperature; one containing polyacrylate, polysiloxane, or polyphosphazene and a copolymer made of them, as preferable elastomer present as a liquid crystalline state at room temperature. In addition, a preferable mesogenic group includes one containing an alkyl group, alkoxy group and/or an oxaalkyl group having, for example, up to 15 chain constituent members, in a longitudinal axis of the mesogen unit.

The elastomer can be synthesized, in the same manner as in usual polymer synthesis, for example, by a simple random copolymerization, or by an addition reaction similar to a random copolymer with a multi-functional cross-linking agent type molecule; as the other method, a method for forming a liquid crystal copolymer by copolymerization of a mesogen monomer with a functional comonomer, followed by converting to a network structure with a cross-linking agent, at a second reaction step, may also be considered.

Amount of a liquid crystal skeleton (a mesogenic group) contained in elastomer at the side chain or the main chain is preferably about 1:1, in molar ratio of a skeleton elastomer to a liquid crystal skeleton, in view of providing shape retention and large deformation amount. A range that is capable of providing practical deformation may be from about 10:1 to about 1:10, but such a range tends to make deformable amount small, or make shape retention difficult.

In the article undergoing stimulus-induced deformation of the present invention, it is preferable that a polymer is composed of a foam.

The article undergoing stimulus-induced deformation of the present invention is composed of a polymer and characterized by having, in a material having a cell, a liquid crystal serving as a deformation source in a skeleton other than the cell of the material having the cell, or in the skeleton; preferably characterized in that the material having the cell is a porous material; more suitably characterized in that a liquid crystal is impregnated in the skeleton; and further suitably characterized in that the porous material is polymer gel.

The article undergoing stimulus-induced deformation of the present invention is composed of a polymer, and in a porous material having a cell, characterized by having, in a polymer chain of a material forming a skeleton other than a cell part, a component showing liquid crystallinity serving as a deformation source as a main chain and/or a side chain; more suitably, the porous material is composed of polymer gel, characterized by having, in a polymer chain forming the gel, a component showing liquid crystallinity serving as a deformation source as a main chain and/or a side chain; and further, in the porous material having a cell, characterized in that a liquid crystal may be impregnated in the skeleton.

Containing a liquid crystal in the skeleton makes the present article undergoing stimulus-induced deformation deform, for example, expand and contract, when temperature stimulus or electric stimulus is given.

A liquid crystal used in the present invention is not especially limited, but it is preferable that nematic-isotropic transition temperature (NI point) is selected so as to be in a room temperature region. By setting to be in a room temperature region, a function such as volume change induced by temperature change can be attained.

In addition, as a specific example of a liquid crystal, in general, one bonded two to four cyclic compounds such as a benzene ring, a cyclohexane ring, a cyclohexene ring, or, in addition, a heteroring such as a pyrimidine ring, a dioxane ring, a pyridine ring; or one using an ester bond, an acetylene bond (ethynylene bond), an ethane bond (ethylene group), an azo bond or the like, called as a mesogenic group at the bonding link; and an azoxy type, a biphenyl type, a phenylcyclohexane type, a phenylester type, a cyclohexanecarboxylic acid phenyl ester type, a phenylpyrimidine type, a methoxyphenyl ester type, and a phenyldioxane type or the like bonded by using a cyano group, a fluoro group, alkyl group, alkenyl group, alkoxy group or the like, as a terminal group or a side-substituent group is included. These liquid crystals may be used alone, but practically it is preferable that a mixture of several kinds is used. It is suitable to use these liquid crystals in the case of deformation induced by electric stimulus.

In consideration of deformation by temperature, these liquid crystals as a simple substance or mixed liquid crystals are adjusted so as to have an isotropic phase at room temperature. An example of having an isotropic phase, as a simple substance, 4-pentyl-4'-cyanobiphenyl (5CB), 4-hexyl-4'-cyanobiphenyl (6CB), 4-hexyl-4'-cyanophenylpyridine, 4-hexyl-4'-propylphenylcyclohexane, 4-methyl-4'-propyldicyclohexane, and 4-hexyl-4'-methoxydicyclohexane or the like is included. In the present invention, these simple substances or mixed substances are referred to as a liquid crystal.

In the article undergoing stimulus-induced deformation of the present invention, it is preferable that at least a pair of electrodes is mounted on the both surfaces of the article. Then, mounting of at least a pair of electrodes on the both surfaces of the article undergoing stimulus-induced deformation is effective, in particular, in the case where deformation is induced by electric stimulus. In the case where a low molecular weight liquid crystal is contained, it is effective in any of the cases that the low molecular weight liquid crystal is contained in the main chain of the skeleton and that the low molecular weight liquid crystal is contained at the side chain of the skeleton.

According to the present invention, the article undergoing stimulus-induced deformation that is instantaneously deformable at room temperature, in air, can be obtained.

(A Production Method)

As a method for including a liquid crystal in a skeleton of a polymer material, a method for mixing and dispersing a liquid crystal in advance in a monomer before formation of a foam, and then making incorporated into a skeleton in foaming and polymerizing; a method for incorporating a liquid crystal into the skeleton after foaming, by impregnation; or the like is included. A liquid crystal is non-volatile, in general, and therefore remains in these skeletons. Here, the amount of a liquid crystal contained in the skeleton is preferably from several % to about 50% of amass of a skeleton material, in view of maintaining skeleton strength to practically induce deformation, but the amount is not especially limited here.

As a method for making a liquid crystal contain into a skeleton of these articles undergoing stimulus-induced deformation, a method by impregnation is also suitable.

It is naturally preferable that a polymer composing the article undergoing stimulus-induced deformation of the present invention has a cell, but in addition, it is preferable to be formed from a foam, in view of a production method. Various materials described above can be subjected to foam molding by a conventionally known cell generation method, for example, a cell generation method by using a thermal decomposition type foaming agent; a cell generation method by using a volatile solvent; a cell generation method by making inert gas absorb in a polymer under high pressure and then foaming under normal pressure; or the like.

Independent foam can be prepared by a method for using a microcapsule containing volatile components in advance as an inclusion; a method for reducing the amount of a foaming component by using a material forming an open cell; or the like.

A liquid crystal can be impregnated by immersing a porous material foamed in advance, in a liquid crystal solvent, and then after impregnation of a liquid crystal molecule in about 1 to 10 days, by flowing out a liquid crystal present in a cell part. Here, filling the cell is allowed up to a degree of not completely filling the cell, and preferably up to 90% of the cell at a maximal; because complete filling of the cell inhibits deformation required. Even in these embodiments, a function as an article undergoing stimulus-induced deformation is secured. Here, it is preferable that an increase in mass by immersion is, in the same manner as a method for the above-described mixing in advance, about several % to about 50% relative to mass of the original skeleton material, but the amount is not especially limited.

It is preferable that the porous material used in the present invention is composed of polymer gel. Since a polymer gel has a functional group in the skeleton, it can be deformed by hydrogen bonding with a functional group of a liquid crystal, or interaction such as static repulsion or the like, and can retain a liquid crystal molecule in a network gel structure. A physical gel not having cross-linking points is also included in the above polymer gel, but a chemical gel having cross-linking points based on chemical bonding is more preferable in view of shape retention.

Figure 7:
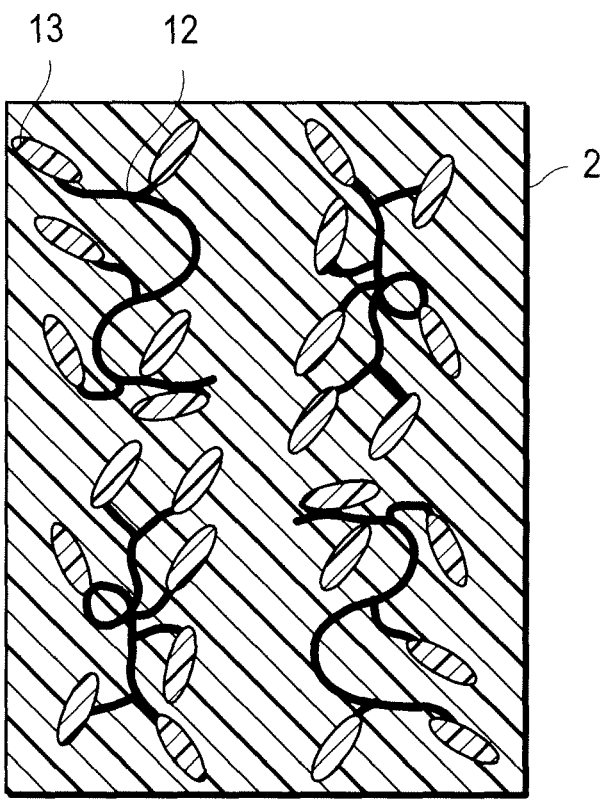
FIG. 7 is a schematic view showing one example of states of a liquid crystal and a polymer chain in a skeleton of an article undergoing stimulus-induced deformation relevant to the present invention.
Figure 8:
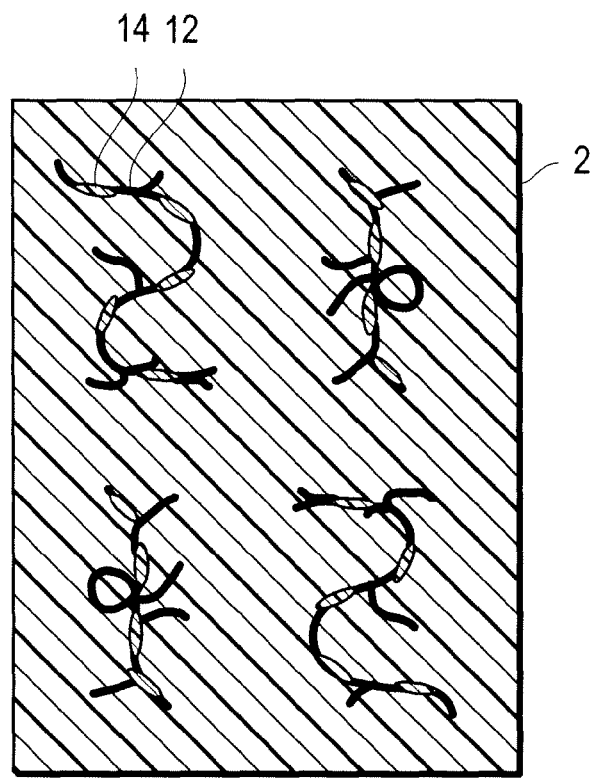
FIG. 8 is a schematic view showing one example of states of a liquid crystal and a polymer chain in a skeleton of an article undergoing stimulus-induced deformation relevant to the present invention.
Figure 9:
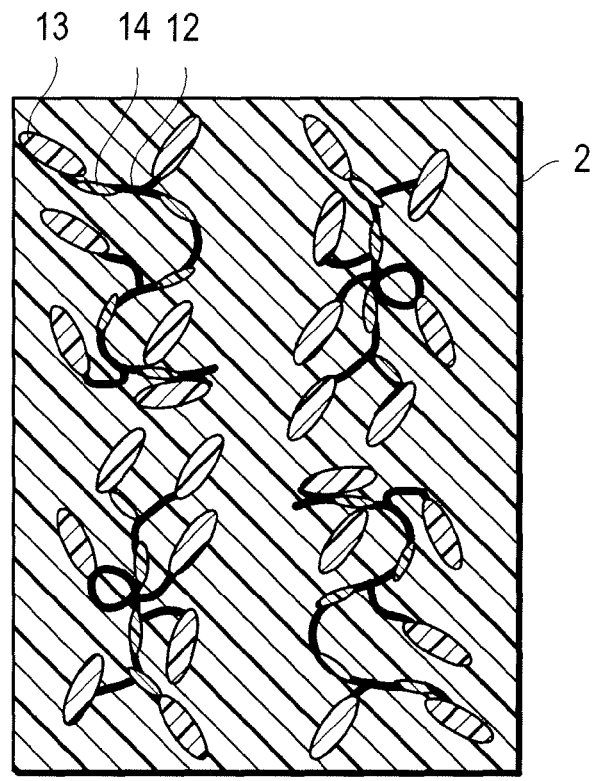
FIG. 9 is a schematic view showing one example of states of a liquid crystal and a polymer chain in a skeleton of an article undergoing stimulus-induced deformation relevant to the present invention.

Then, as other embodiments, even for a porous material composing of a polymer and having a cell, a method for having a component showing liquid crystallinity as a deformation source, in a polymer chain of a material forming a skeleton other than the cell of the porous material, as a main chain and/or a side chain is also included. This method is an extremely suitable method in view of not only not requiring a mixing or impregnation step, but also being capable of incorporating a liquid crystal molecule necessary for deformation without waste, because a liquid crystal molecule can be structurally incorporated in the porous material. As described-above, by the addition of a liquid crystal into a material before foaming by a known cell generation means using various materials, and then foaming, a skeleton containing a liquid crystal can be formed. The addition amount of a liquid crystal or the like is not especially limited, and for example, it is in a range from several % to about 50%, relative to mass of the skeleton material. In addition, in the case where the skeleton showing liquid crystallinity contains a main chain and/or a side chain, for example, as described above, foaming can be generated by a known cell generation means, in the skeleton material and a material showing a liquid crystallinity containing a main chain and/or a side chain. In addition, since deformation of the skeleton itself can be induced by temperature stimulus or electric stimulus, deformation amount can be set in an extremely large quantity. Here, one containing a skeleton showing a liquid crystallinity in a main chain (contained as a component forming a backbone) and/or a side chain, in a polymer chain, is referred to as liquid crystal elastomer (FIGS. 7 to 9: A void is omitted).

Also in the case of using liquid crystal elastomer, it is preferable that the porous material is polymer gel; it is more suitable because suitable cushion property can be provided and at the same time deformation can be easily made, by containing the above-described polymer gel in the main chain and/or the side chain of a composing polymer.

Then, as described above, mounting of at least a pair of electrodes provided on the both surfaces of the article undergoing stimulus-induced deformation is effective, in particular, in the case where deformation is made by electric stimulus. In the case where a low molecular weight liquid crystal is contained, it is effective in any of the cases that the low molecular weight liquid crystal is contained at the main chain in the skeleton and that the low molecular weight liquid crystal is contained at the side chain in the skeleton. As a method for mounting an electrode, a method for coating an electric conductor generally used; a method for vapor depositing an electric conductor; or the like may be used as appropriate.

(Action)

The present invention, by combination of these porous materials and a liquid crystal, is capable of reversibly executing repeated volume change without accompanying release of a solvent, which could not be attained by a conventional material. Explanation will be given below on this principle.

By making a liquid crystal contain in the skeleton of a polymer material having a cell, the article undergoing stimulus-induced deformation of the present invention deforms by giving temperature stimulus or electric stimulus.

In the case of temperature stimulus, apparent volume change occurs at the border of isotropic phase transition temperature of a liquid crystal.

Figure 10A:
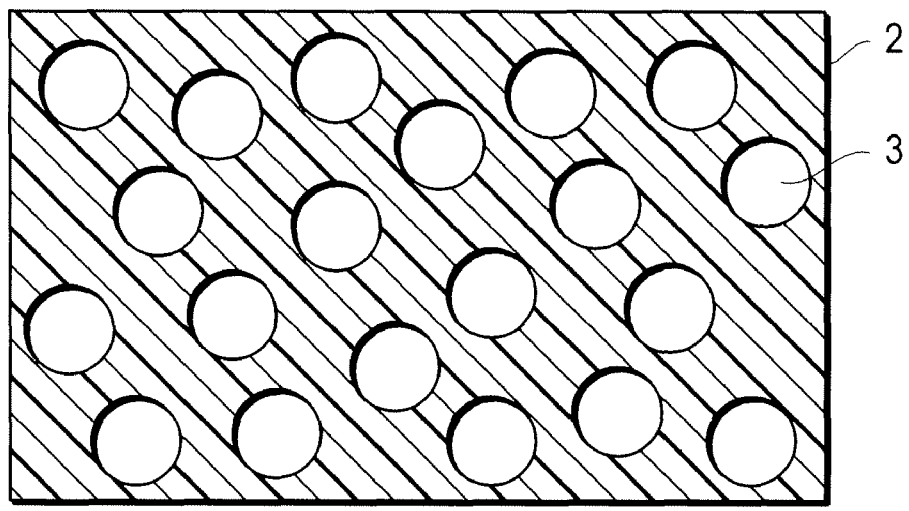
FIG. 10a is a schematic cross-sectional view showing drive principle of an article undergoing stimulus-induced deformation relevant to the present invention.
Figure 10B:
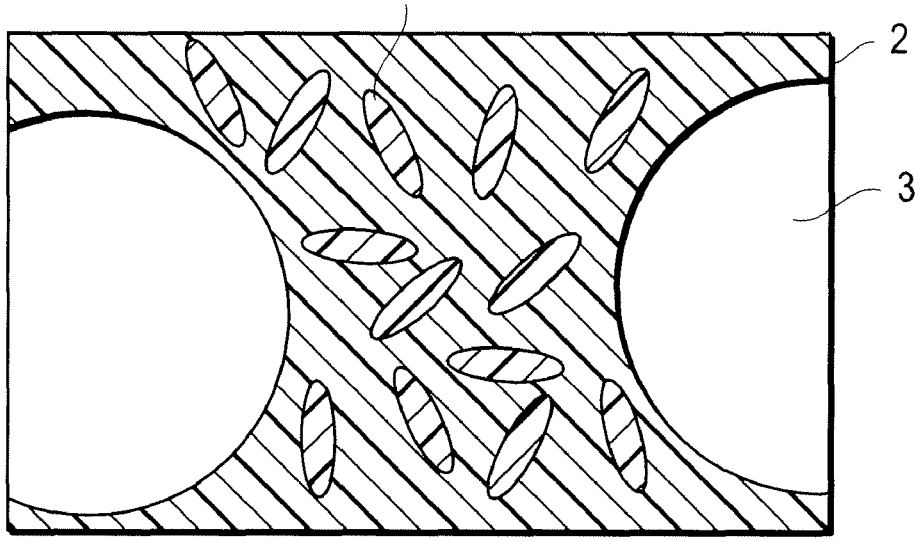
FIG. 10b is other schematic cross-sectional view showing drive principle of an article undergoing stimulus-induced deformation relevant to the present invention.
Figure 10C:
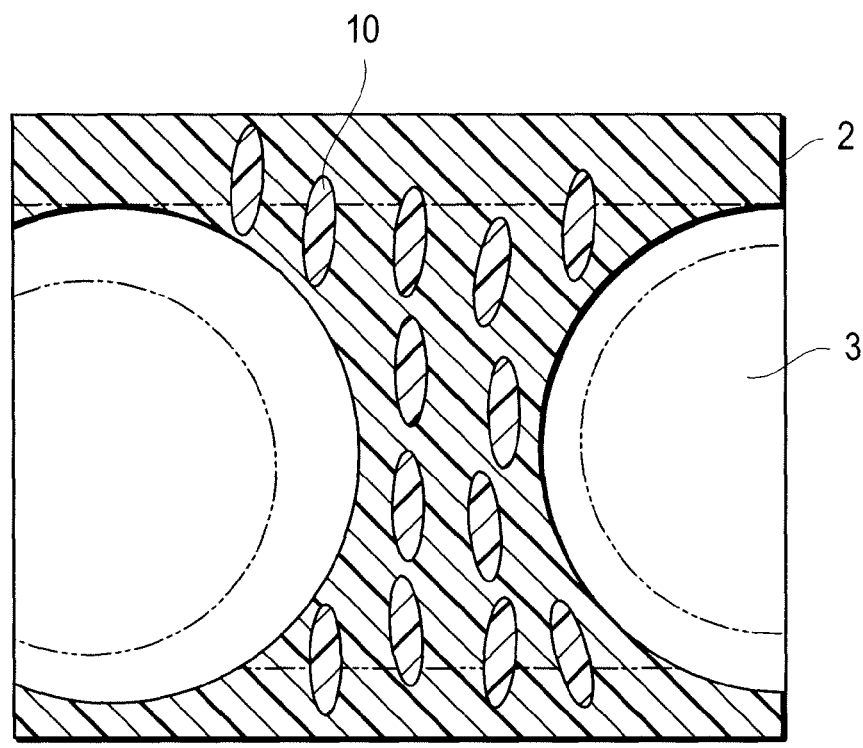
FIG. 10c is still other schematic cross-sectional view showing drive principle of an article undergoing stimulus-induced deformation relevant to the present invention.

In a state that a liquid crystal molecule is anisotropically arranged in a skeleton, the skeleton also receives anisotropic stretching accompanying with stimulus when the liquid crystal molecule receives the stimulus, and although volume of the skeleton itself does not change, apparent volume increases (FIG. 10, *a*: a schematic cross-sectional view; *b*: an enlarged view of a dashed line part (in the case of random orientation of a liquid crystal); *c*: an enlarged view of a dashed line part (in the case of regular orientation of a liquid crystal).

Since a liquid crystal molecule takes a random orientation state at temperature equal to or higher than the isotropic phase temperature, tension force of the skeleton does not work, and a relatively contracted state is provided; as a result, the skeleton becomes large and short, a cell becomes small, and apparent volume becomes small. For example, an article undergoing stimulus-induced deformation, which is prepared by polymerization in a state of a liquid crystal being arranged in advance in an electric field, retains the original shape at temperature equal to or lower than the isotropic phase transition temperature, but shows smaller shape at temperature over that temperature; naturally when temperature is returned to the original level, the apparent volume also returns to the original level. Deformation amount at this time depends on an orientation direction of the liquid crystal molecule, and tends to more largely deform in a longitudinal direction of the liquid crystal molecule.

Figure 11:
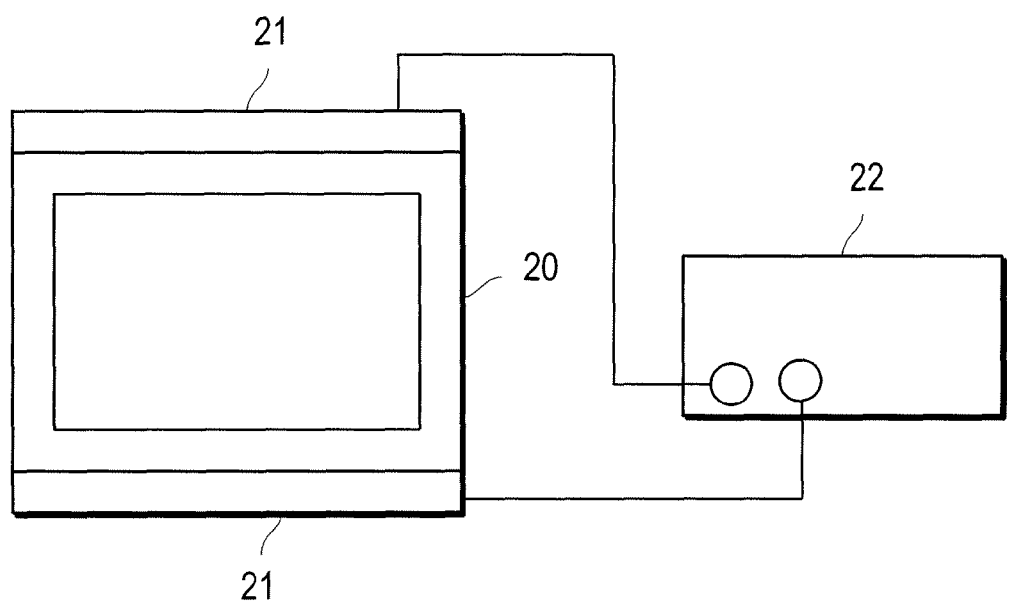
FIG. 11 is a schematic view showing one example of a production apparatus of an article undergoing stimulus-induced deformation relevant to the present invention.

In producing these, for example, an apparatus of FIG. 11, which is provided with an apparatus for applying an electric field at the same time of a foaming step, is used. In FIG. 11, the mold for foam-molding 20 is configured by being sandwiched with a pair of the electric field application electrodes 21, and each of such electric field application electrodes 21 is wire connected with the voltage generation apparatus 22.

Similar effect can be naturally obtained even in a liquid crystal not oriented in advance, but it tends to provide smaller deformation amount in general.

Even in electric stimulus, apparent volume change can be similarly induced.

Figure 12:
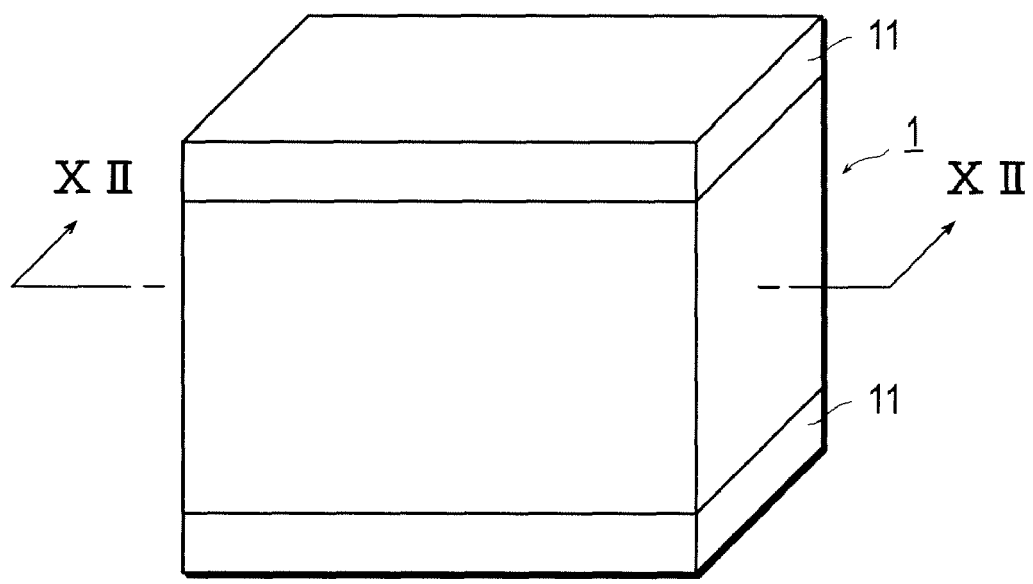
FIG. 12 is a perspective view and a cross-sectional view showing one example of an article undergoing stimulus-induced deformation mounted with an electrode relevant to the present invention.
Figure 12:
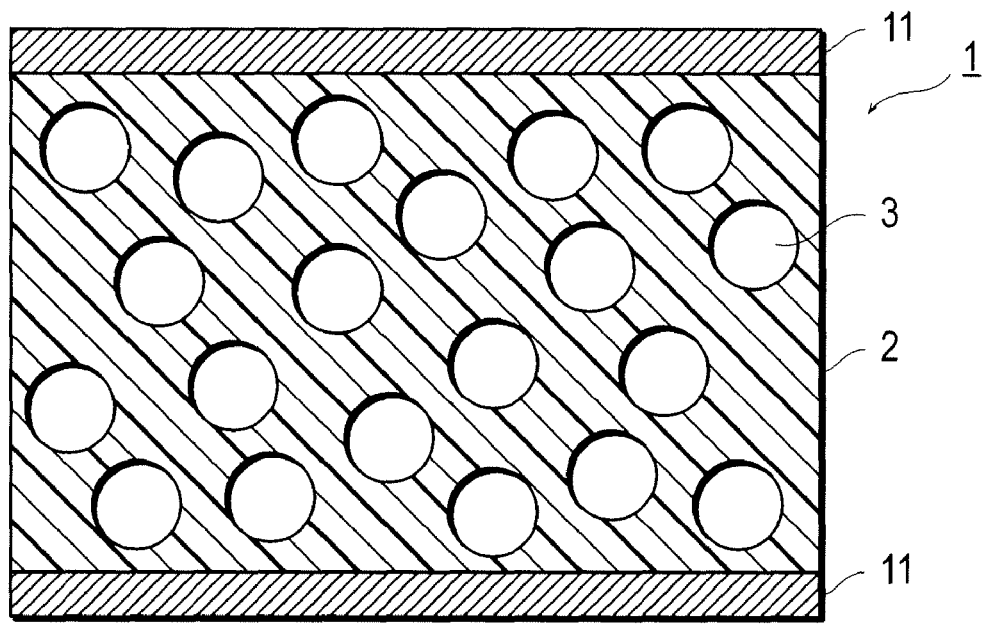
Figure 13:
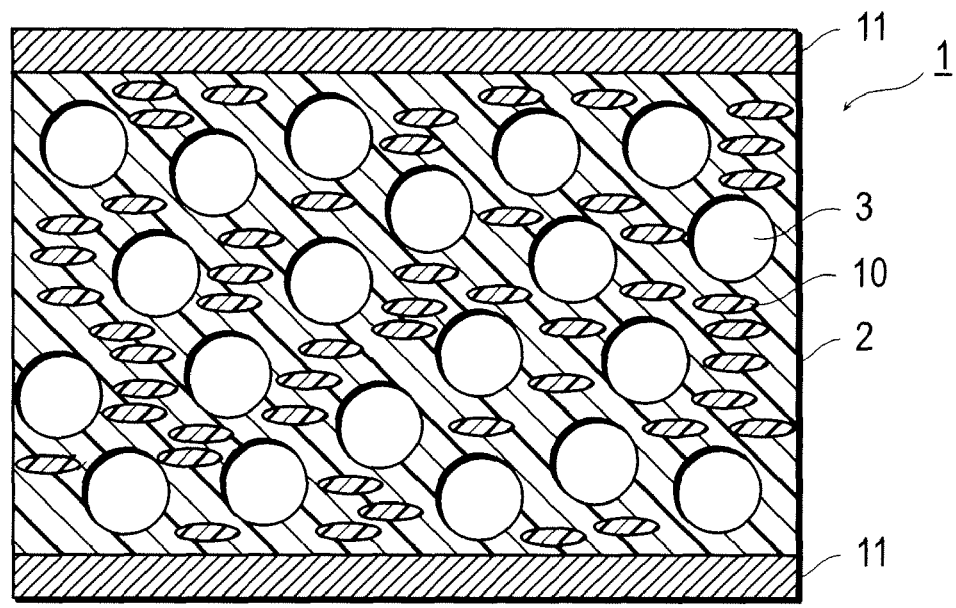
FIG. 13 is a schematic cross-sectional view showing one example of an article undergoing stimulus-induced deformation mounted with an electrode relevant to the present invention, and oriented with a liquid crystal molecule in advance.

In this case, it is suitable that at least a pair of electrodes is mounted on the both surfaces of the article undergoing stimulus-induced deformation (FIG. 12, *a*: a perspective view, *b*: a cross-sectional view cut along the XII-XII line). In this way, by mounting of electrodes in an opposite way relative to a cushion, and by application of voltage, a liquid crystal between the electrodes is arranged. With this arrangement, in the same manner as in the above-described temperature stimulus, deformation of a cushion is induced. In the case where a cushion is made in an orientated state of a liquid crystal in advance, large displacement can be taken out, because the liquid crystal molecule can be moved more largely by mounting the electrodes at the both surfaces in a vertical direction relative to the orientation axis (FIG. 13).

Voltage applied in this case is suitably from 1 to about 100 V usually, but in the case where a cushion is used in a thin shape, deformation is possible even by from several mV to several hundreds mV. In addition, in the case of a thick shape, on the contrary, deformation is possible even by several kV, but nothing is limited here.

Figure 14:
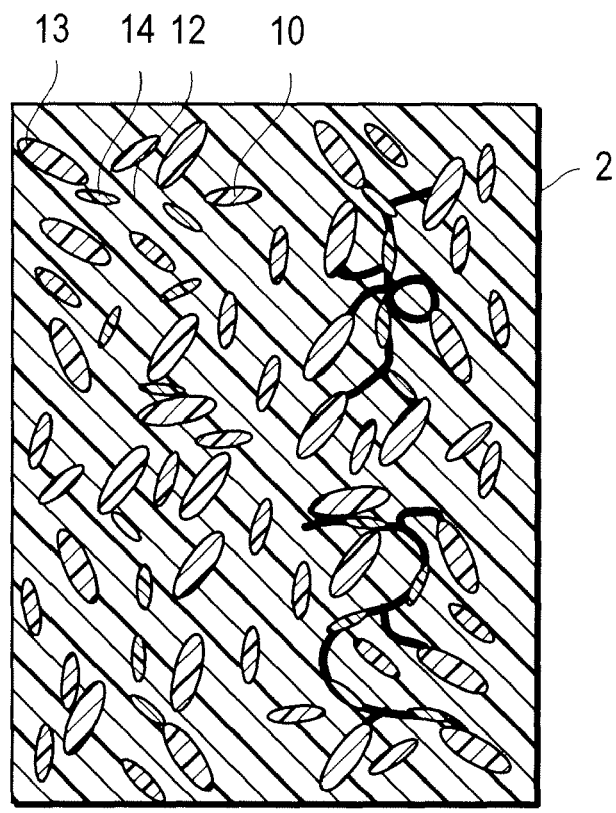
FIG. 14 is a schematic view showing one example of a state of liquid crystal molecule and a polymer chain in a skeleton of an article undergoing stimulus-induced deformation relevant to the present invention.

In this way, by containing a liquid crystal in the article undergoing stimulus-induced deformation, wherein polymer gel is used as a material forming a skeleton, the article undergoing stimulus-induced deformation can be moved more largely (FIG. 14: A void is omitted), and in this case more larger deformation can be obtained, by combination of drive of the skeleton itself and drive of a liquid crystal molecule; namely, a combination of a liquid crystal contained in the skeleton itself and the a liquid crystal molecule is capable of exerting more excellent effect.

(Applications)

The article undergoing stimulus-induced deformation of the present invention is preferably used as a vehicle part. By substitution of the obtained article undergoing stimulus-induced deformation for a cushion material used in an interior material of a vehicle, it can be used for improvement of comfortable sit-feeling for a passenger or comfortable drive-feeling by cushion movement, and as a means for signal transmission from a vehicle to a passenger or the like. Among means for solving the above-described problems, the article undergoing stimulus-induced deformation of the present invention belongs to a technique for furnishing a function not conventionally attainable, without increasing new space or mass, and is thus extremely suitable.

Figure 15:
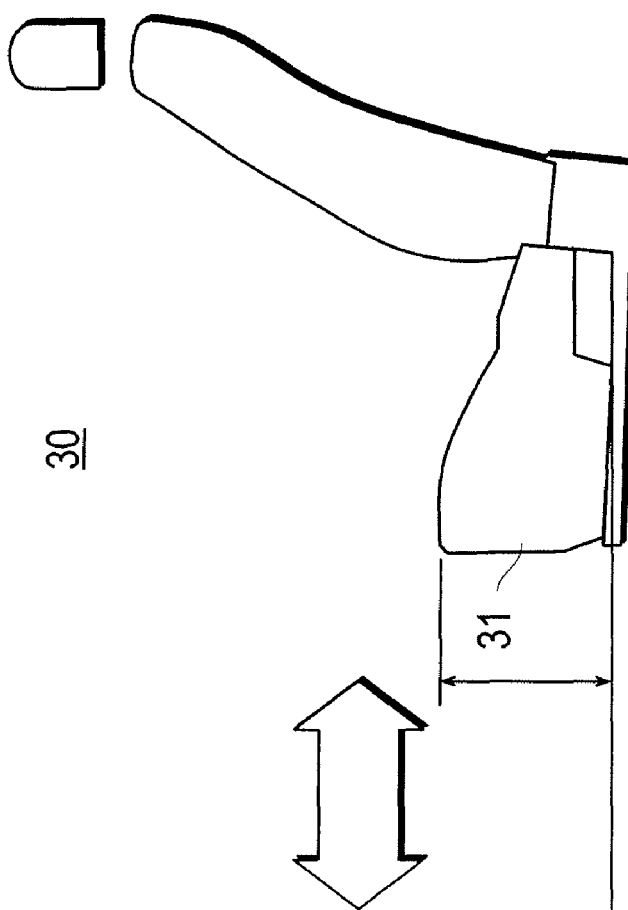
FIG. 15 is a schematic view showing one example of a vehicle part using an article undergoing stimulus-induced deformation relevant to the present invention.
Figure 15:
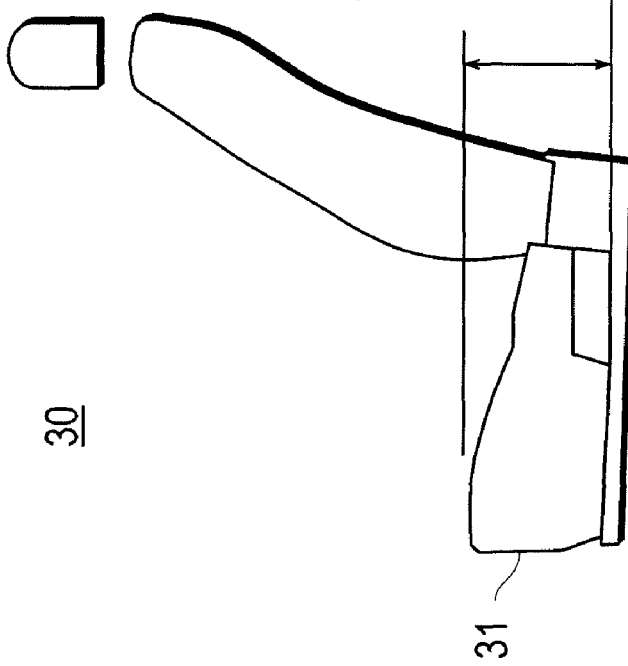
Figure 16:
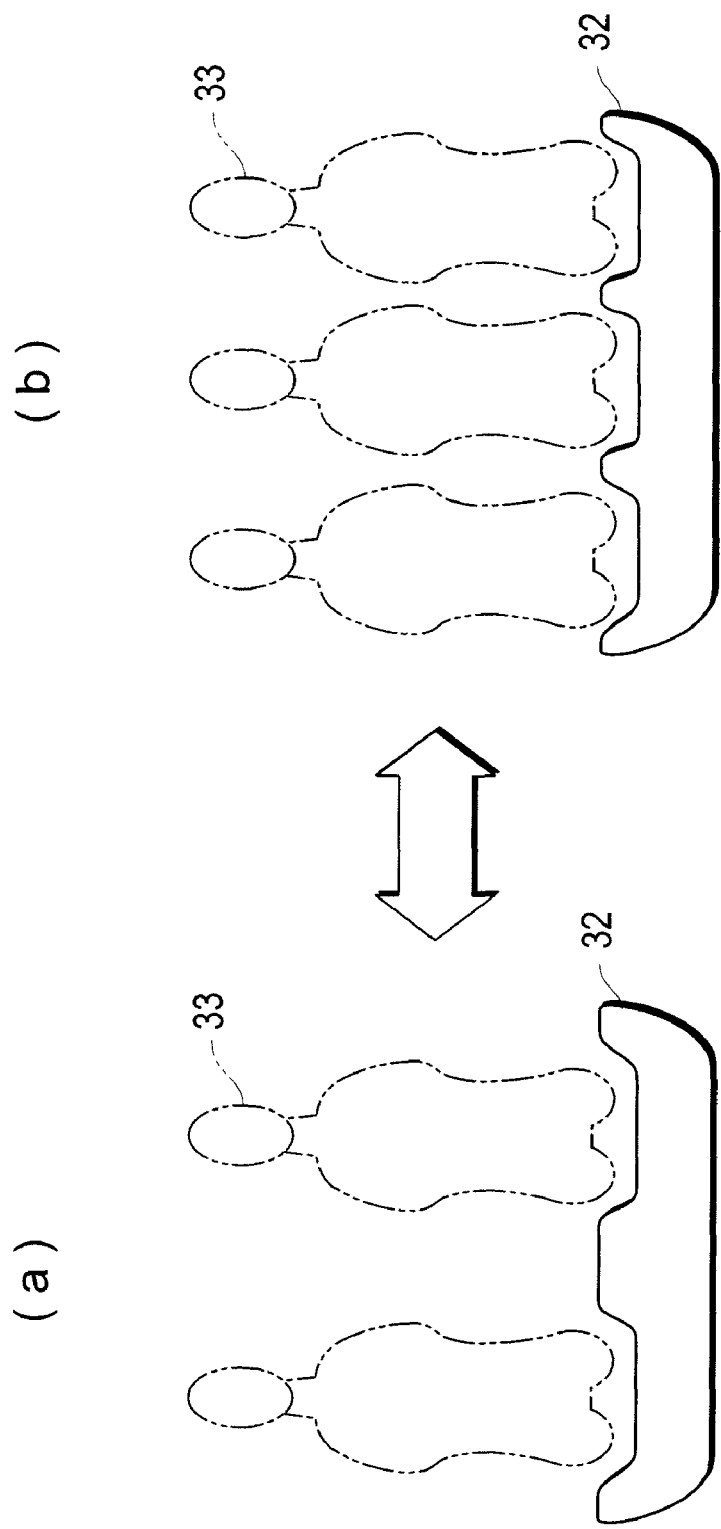
FIG. 16 is a schematic view showing other examples of a vehicle part using an article undergoing stimulus-induced deformation relevant to the present invention.

For example, FIGS. 15 and 16 show appearance when it is used as a seat cushion of a vehicle. In FIG. 15 (*a*: a schematic view showing the case of an low seating surface, *b*: a schematic view showing the case of an elevated seating surface), ascending or descending of the seating surface 31 can be executed without using mechanical movement, in response to physical size of a passenger, in the case of the seat 30 for each passenger. Similarly in FIG. 16 (*a*: a schematic view showing the case of a seat for two passengers, *b*: a schematic view showing the case of a seat for three passengers), only the necessary part of the seating surface can be dented or inflated to obtain suitable hold-feeling, in response to number of the passengers 33, in the case of the seat for multiple passengers, for example, the bench sheet 32. Because both cases do not have a mechanical system, even the addition of the mechanism according to the present invention does not incur any increase in large mass, and is capable of preventing deterioration of fuel consumption.

EXAMPLES

Explanation will be given in further specifically below on the present invention, based on Examples.

Example 1

By execution of cross-linking while mildly foaming under an environment of 50° C., using an aqueous solution containing N,N'-methylenebisacrylamide as a cross-linking agent; acrylamide as a monomer; potassium persulfate as an initiator; and thermal decomposition type sodium hydrogen carbonate as a foaming agent, a porous material (polymer gel) was obtained. Size of a cell was about 500 μm, and foaming ratio was about 20 times.

Then, this porous material was subjected to drying, and after removing moisture, the material was cut out to dice-shape pieces with a side length of 1 cm, which was immersed in 4-pentyl-4'-cyanobiphenyl (5CB) for 10 days. After taking out the dices, they were subjected to leaving for 5 days, and 5CB in a cell part was removed to yield an article undergoing stimulus-induced deformation. A mass before immersion of 0.060 g increased to 0.071 g.

This article undergoing stimulus-induced deformation showed an expanded state at a lower temperature side, and a contracted state at a high temperature side, at the border of around 35° C., which is isotropic phase transition temperature of the liquid crystal. Contraction here was about 0.2 mm, based on the size at the lower temperature side.

Repeated expansion and contraction induced by environmental change were observed within 1 minute.

Example 2

In the same manner as in Example 1, a dice-shaped article undergoing stimulus-induced deformation with a side length of 1 cm was obtained, silver paste was coated as electrodes on a pair of the opposite surfaces thereof, and then a copper wire with a diameter of 0.05 mm was adhered together as an electric wire.

Appearance that distance between the electrodes was lengthened by a length of about 0.2 mm was observed by application of a direct-current voltage of 10 V on this article undergoing stimulus-induced deformation, under an environment of 25° C.

Repeated expansion and contraction were observed by changing a state of voltage application and a state of voltage non-application, even at about 10 Hz.

Example 3

A 30-fold foamed urethane cushion was cut out to dice-shape pieces with a side length of 1 cm, which was immersed in 4-pentyl-4'-cyanobiphenyl (5CB) for 10 days. A mass before immersion of 0.040 g increased to 0.049 g.

This article undergoing stimulus-induced deformation showed an expanded state at a lower temperature side, and a contracted state at a high temperature side, at the border of around 35° C., which is isotropic phase transition temperature of the liquid crystal. Contraction here was about 0.1 mm, based on the size at the lower temperature side.

Repeated expansion and contraction induced by environmental change were observed within 1 minute.

Example 4

In the same manner as in Example 3, a dice-shaped article undergoing stimulus-induced deformation with a side length of 1 cm was obtained, silver paste was coated as electrodes on a pair of the opposite surfaces thereof, and then a copper wire with a diameter of 0.05 mm was adhered together as an electric wire.

Appearance that distance between the electrodes was lengthened by a length of about 0.1 mm was observed by application of a direct-current voltage of 10 V on this article undergoing stimulus-induced deformation, under an environment of 25° C.

Repeated expansion and contraction were observed by changing a state of voltage application and a state of voltage non-application, even at about 10 Hz.

Example 5

Into a material before foaming, in the same manner as in Example 1, 5CB was mixed in amass ratio of 10%, and this material was subjected to foaming and cross-linking at 50° C. Then this porous material was subjected to drying, and after removing moisture, the material was cut out to dice-shape pieces with a side length of 1 cm.

This article undergoing stimulus-induced deformation showed an expanded state at a lower temperature side, and a contracted state at a high temperature side, at the border of around 35° C., which is isotropic phase transition temperature of the liquid crystal. Contraction here was about 0.2 mm, based on the size at the lower temperature side.

Repeated expansion and contraction induced by environmental change were observed within 1 minute.

Example 6

Into a urethane resin before foaming, 5CB was mixed in a mass ratio of 10%, and this material was subjected to foaming in a mold under application of an electric field of 10 kV. The resultant urethane had a foaming ratio of about 25 times, and a mass of 0.048 g when cut out to pieces with a side length of 1 cm.

This article undergoing stimulus-induced deformation showed an expanded state at a lower temperature side, and a contracted state at a high temperature side, at the border of around 35° C., which is isotropic phase transition temperature of the liquid crystal. Contraction here was about 0.1 mm, based on the size at the lower temperature side.

Repeated expansion and contraction induced by environmental change were observed within 1 minute.

Example 7

By execution of cross-linking while mildly foaming under an environment of 50° C., using poly(methylhydrogensiloxane) as a skeleton material of elastomer; 4-but-3-enyloxybenzoic acid 4-methoxyphenyl ester as a liquid crystal molecule at the side chain; 1-(4-hydroxy-4'-biphenyl)-2-[4-(10-undecenyloxy)phenyl]butane as a main chain component; and thermal decomposition type sodium hydrogen carbonate as a foaming agent, a porous material was obtained. The resultant porous material was composed of 80% by mass of the skeleton material, 10% by mass of the side chain and 10% by mass of the main chain.

an article undergoing stimulus-induced deformation with a side length of 1 cm was obtained by cutting out this material, and silver paste was coated as electrodes on a pair of the opposite surfaces thereof, and then a copper wire with a diameter of 0.05 mm was adhered together as an electric wire.

Appearance that distance between the electrodes was lengthened by a length of about 0.3 mm was observed by application of a direct-current voltage of 10 V on this article undergoing stimulus-induced deformation, under an environment of 25° C.

Repeated expansion and contraction were observed by changing a state of voltage application and a state of voltage non-application, even at about 10 Hz.

Example 8

By mixing 1900% by volume ratio of a microcapsule (manufactured by Matsumoto Fat and Oil Co., Ltd.: Microsphere F-80ED) for obtaining a close cell, and 10% by mass of 5CB, into an aqueous solution containing N,N'-methylenebisacrylamide as a cross-linking agent; acrylamide as a monomer; and potassium persulfate as an initiator, and execution of cross-linking under an environment of 50° C., a porous material (polymer gel) was obtained. The resultant porous material was composed of 90% by mass of the skeleton material, and 10% by mass of the liquid crystal.

This article undergoing stimulus-induced deformation showed an expanded state at a lower temperature side, and a contracted state at a high temperature side, at the border of around 35° C., which is isotropic phase transition temperature of the liquid crystal. Contraction here was about 0.1 mm, based on the size at the lower temperature side.

Repeated expansion and contraction induced by environmental change were observed within 1 minute.

Comparative Example 1

A 30-fold foamed urethane was cut out to a side length of 1 cm, and silver paste was coated as electrodes on a pair of the opposite surfaces thereof, and then a copper wire with a diameter of 0.05 mm was adhered together as an electric wire.

Change of distance between the electrodes was not observed by application of a direct-current voltage of 10 V on this article undergoing stimulus-induced deformation, under an environment of 25° C. In addition, displacement of this sample was measured by changing environment temperature from 5° C. to 80° C., but the change was not observed.

Comparative Example 2

By execution of cross-linking while mildly foaming under an environment of 50° C., using an aqueous solution containing N,N'-methylenebisacrylamide as a cross-linking agent; acrylamide as a monomer; potassium persulfate as an initiator; and thermal decomposition type sodium hydrogen carbonate as a foaming agent, a porous material was obtained.

This material was cut out to a side length of 1 cm, and silver paste was coated as electrodes on a pair of the opposite surfaces thereof, and then a copper wire with a diameter of 0.05 mm was adhered together as an electric wire.

Change of distance between the electrodes was not observed by application of a direct-current voltage of 10 V on this article undergoing stimulus-induced deformation, under an environment of 25° C. In addition, displacement of this sample was measured by changing environment temperature from 5° C. to 80° C.; appearance of volume contraction was observed after about one hour passed at high temperature side, but the change was not observed during several hours after returning to low temperature.

(Evaluation Test) Deformation Amount Test

The articles undergoing stimulus-induced deformation obtained in Examples 1 to 8 and Comparative Examples 1 to 3, together with a conventional one were evaluated using a laser displacement gauge (manufactured by KEYENCE CORP.: LB-5000) by setting temperature condition as appropriate in a thermostatic chamber (FIG. 17).

Figure 17:
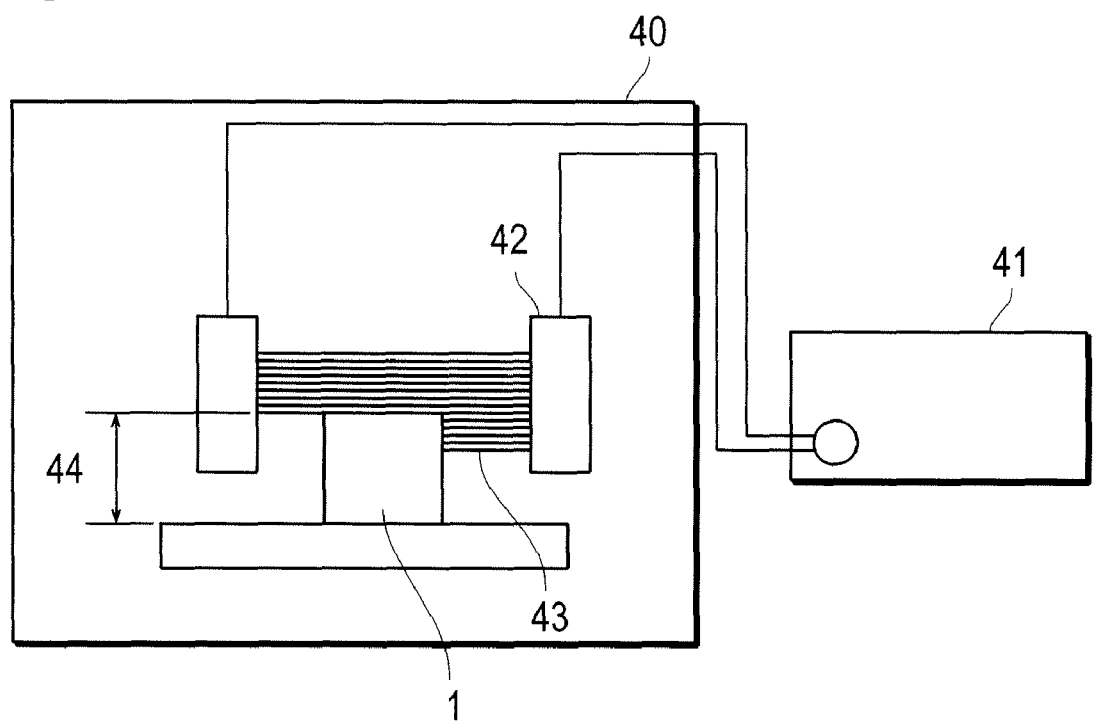
FIG. 17 is a schematic view showing one example of an evaluation method relevant to the present invention.

In FIG. 17, the porous material 1, as a sample, is mounted between a pair of the measurement heads 42 in the thermostatic chamber 40, and expansion and contraction of the sample are measured using the measurement laser 43 to determine displacement thereof with the laser displacement gauge 41 mounted exterior the thermostatic chamber 40.

The above-described contents are preferable embodiments, and various modifications and corrections should be executed within a range of the present invention, without departing from the sprit and the scope of the present invention.

The present application claims benefit of application No. 2005-176763 filed in the Japanese Patent Office on Jun. 16, 2005, whose disclosed contents are incorporated herein by reference in its entirety.

INDUSTRIAL APPLICABILITY

The article undergoing stimulus-induced deformation of the present invention can be utilized as a vehicle part, for example, a cushion material.

The invention claimed is:

1. An article capable of undergoing stimulus-induced deformation comprising,
a polymer gel comprising:
a skeleton; and
cells dispersed within the skeleton; and
a liquid crystal serving as a deformation source selected from the group consisting of 4-pentyl-4'-cyanobiphenyl, 4-hexyl-4'-cyanobiphenyl, 4-hexyl-4'-cyanophenylpyridine, 4-but-3-enyloxybenzoic acid 4-methoxyphenyl ester, and 1-(4-hydroxy-4'-biphenyl)-2-[4-(10-undecenyloxy)phenyl]butane,
wherein a mesogenic group of the liquid crystal is bound to a polymer chain of the polymer as a side chain and generates a liquid crystal phase state of an elastomer.

2. The article capable of undergoing stimulus-induced deformation according to claim 1, wherein the skeleton further includes a second liquid crystal impregnated in the skeleton.

3. The article capable of undergoing stimulus-induced deformation according to claim 1, wherein the cells are open cells.

4. The article capable of undergoing stimulus-induced deformation according to claim 1, wherein at least a pair of electrodes are provided on surfaces of the article undergoing stimulus-induced deformation.

5. The article capable of undergoing stimulus-induced deformation according to claim 1, wherein the polymer gel is a foam.

6. A vehicle part comprising the article capable of undergoing stimulus-induced deformation set forth in claim 1.

7. The article capable of undergoing stimulus-induced deformation according to claim 1, wherein the liquid crystal serving as the deformation source is selected from the group consisting of 4-pentyl-4'-cyanobiphenyl, 4-hexyl-4'-cyanobiphenyl, and 4-hexyl-4'-cyanophenylpyridine.

8. The article capable of undergoing stimulus-induced deformation according to claim 1, wherein the stimulus-induced deformation causes a change in length of 10-30%.

9. An article capable of undergoing stimulus-induced deformation comprising,
a porous material comprising:
a skeleton formed by a polymer; and
cells dispersed within the skeleton;
at least a pair of electrodes provided on surfaces of the article, and
a component showing liquid crystallinity serving as a deformation source selected from the group consisting of 4-pentyl-4'-cyanobiphenyl, 4-hexyl-4'-cyanobiphenyl, 4-hexyl-4'-cyanophenylpyridine, 4-but-3-enyloxybenzoic acid 4-methoxyphenyl ester, and 1-(4-hydroxy-4'-biphenyl)-2-[4-(10-undecenyloxy)phenyl]butane as a main chain and/or a side chain in the polymer chain of the polymer forming the skeleton.

10. The article capable of undergoing stimulus-induced deformation according to claim 9, comprising, a liquid crystal in the skeleton other than the cells.

11. The article capable of undergoing stimulus-induced deformation according to claim 9, wherein the cells are open cells.

12. The article capable of undergoing stimulus-induced deformation according to claim 9, wherein the polymer material is a foam.

13. A vehicle part comprising the article capable of undergoing stimulus-induced deformation set forth in claim 9.

14. The article capable of undergoing stimulus-induced deformation according to claim 9, wherein the component showing liquid crystallinity serving as the deformation source is selected from the group consisting of 4-pentyl-4'-cyanobiphenyl, 4-hexyl-4'-cyanobiphenyl, and 4-hexyl-4'-cyanophenylpyridine as the main chain and/or the side chain in the polymer chain of the polymer forming the skeleton.

15. The article capable of undergoing stimulus-induced deformation according to claim 9, wherein the stimulus-induced deformation causes a change in length of 10-30%.

* * * * *